United States Patent
Davis et al.

(10) Patent No.: US 9,362,072 B2
(45) Date of Patent: Jun. 7, 2016

(54) MAGNETIC FLOAT SWITCH

(75) Inventors: Jason James Davis, Ashland, OH (US); Douglas Richard Rogers, Perrysville, OH (US); Shane R. Vallen, Copley, OH (US)

(73) Assignee: Pentair Flow Technologies, LLC, Delavan, WI (US)

( * ) Notice: Subject to any disclaimer, the term of this patent is extended or adjusted under 35 U.S.C. 154(b) by 244 days.

(21) Appl. No.: 13/491,439

(22) Filed: Jun. 7, 2012

(65) Prior Publication Data
US 2013/0327625 A1    Dec. 12, 2013

(51) Int. Cl.
| H01H 36/02 | (2006.01) |
| H01H 35/18 | (2006.01) |
| G01F 23/64 | (2006.01) |
| G01F 23/72 | (2006.01) |
| G01F 23/74 | (2006.01) |
| G01F 23/76 | (2006.01) |
| H01H 35/02 | (2006.01) |

(52) U.S. Cl.
CPC ............ *H01H 35/186* (2013.01); *G01F 23/64* (2013.01); *G01F 23/72* (2013.01); *G01F 23/74* (2013.01); *G01F 23/76* (2013.01); *H01H 36/02* (2013.01); *H01H 35/022* (2013.01)

(58) Field of Classification Search
CPC ... H01H 35/022; H01H 35/186; H01H 36/02; G01F 23/72; G01F 23/74; G01F 23/76; G01F 23/64
USPC ........................................................ 200/84 C
See application file for complete search history.

(56) References Cited

U.S. PATENT DOCUMENTS

| 2,851,566 | A |   | 9/1958  | Fuller |
| 3,026,387 | A |   | 3/1962  | Ashbaugh |
| 3,322,917 | A |   | 5/1967  | Furlow |
| 3,356,804 | A |   | 12/1967 | Perl |
| 3,483,341 | A |   | 12/1969 | Reichensperger |
| 3,826,139 | A |   | 7/1974  | Bachman |
| 3,868,485 | A |   | 2/1975  | Sykes et al. |
| 3,944,770 | A |   | 3/1976  | Pepper |
| 4,021,144 | A |   | 5/1977  | Matsusaka |
| 4,084,073 | A |   | 4/1978  | Keener |
| 4,086,457 | A |   | 4/1978  | Niedermeyer |
| 4,165,935 | A | * | 8/1979  | Bongort et al. ............... 335/207 |
| 4,215,975 | A |   | 8/1980  | Niedermeyer |
| 4,302,641 | A |   | 11/1981 | Johnston |
| 4,373,155 | A |   | 2/1983  | Dola |

(Continued)

FOREIGN PATENT DOCUMENTS

WO    WO 2010/011942 A1    1/2010

OTHER PUBLICATIONS

International Search Report for International Application No. PCT/US2013/044765.

*Primary Examiner* — Renee S Luebke
*Assistant Examiner* — Lheiren Mae A Caroc
(74) *Attorney, Agent, or Firm* — Quarles & Brady LLP (57) ABSTRACT

A float switch with a float housing having a magnetically-activated, hermetically-sealed reed switch secured within an interior cavity in a first orientation and a permanent magnet positioned in a second orientation. The permanent magnet is movable within a chamber in the interior cavity between a first activation position and a second non-activation position. For connection to a pump, electrical conductors extend from the float housing at one end and are electrically coupled to the reed switch.

17 Claims, 9 Drawing Sheets

(56) References Cited

U.S. PATENT DOCUMENTS

| | | |
|---|---|---|
| 4,378,475 A | 3/1983 | McNiel |
| 4,629,841 A | 12/1986 | Riback et al. |
| 4,644,117 A | 2/1987 | Grimes et al. |
| 4,792,576 A | 12/1988 | Nodelman |
| 4,962,370 A | 10/1990 | Borriello |
| 5,017,748 A * | 5/1991 | Sapiro ........................ 200/84 C |
| 5,250,768 A | 10/1993 | Van Fossen |
| 5,283,402 A * | 2/1994 | Green .................... 200/61.45 R |
| 5,552,774 A * | 9/1996 | Gridley ......................... 340/623 |
| 5,562,423 A * | 10/1996 | Orth et al. ....................... 417/40 |
| 5,621,393 A | 4/1997 | Urich |
| 8,263,884 B1 * | 9/2012 | Salmon et al. ........ 200/61.45 M |
| 2004/0182152 A1 | 9/2004 | Ricco |
| 2010/0132455 A1 | 6/2010 | Boehmer |

\* cited by examiner

MAGNETIC FLOAT SWITCH

BACKGROUND OF THE INVENTION

Many conventional liquid pumps are directly or indirectly coupled to a switch or similar device that detects a liquid level in order to activate the pump when needed. Activation can include providing a signal to the pump to start or stop operation, and/or providing or removing power to the pump to start or stop the pump from operating. Activation can also include, for example, triggering alarms at pre-determined liquid levels of high and/or low level events.

For many years, a common liquid level control switch consisted of a mercury switch embedded in a foam or plastic "float" housing. The fluctuating liquid level would cause the float to physically move, which would cause the mercury switch to close or open a circuit, depending on whether the mercury switch was normally open or normally closed. Mercury float switches were the industry standard due to their extreme reliability in harsh working environments. However, increasingly stringent regulations regarding products containing mercury have caused the industry to begin a shift toward alternative solutions for the mercury float switch. Currently, the most common alternative is the mechanical float switch.

Although there are several design variations of mechanical float switches on the market, the general perception is that they lack the reliability of the mercury switch design due to a multitude of moving parts inside the float housing. The moving parts can degrade operation by becoming misaligned, damaged due to impact in shipping and/or operation, corrode and cease to operate, become damaged due to electrical arcing and/or chattering, as well as many other failure modes.

Floats with an embedded magnet have also been used to activate or deactivate a switch. Yet, in conventional configurations, the magnet is not adequately secured so as to avoid physical interaction with the float housing or other components of the switch. In addition, the float, with the integrated magnet, is typically positioned in the liquid to be sensed. This can lead to problems with residue buildup and/or floating debris, causing the interaction between the magnet and the switch to degrade and eventually fail.

BRIEF DESCRIPTION OF THE INVENTION

There is a need, therefore, for a float switch that reduces or eliminates many moving parts that are capable of degrading operation of the float switch.

Some embodiments of the invention overcome these problems by providing a float switch that includes a movable permanent magnet and a hermetically sealed magnetic reed switch, which reduces the moving parts to only the movable permanent magnet and a contact within the reed switch. The permanent magnet and the magnetic reed switch are encased within a housing, and the housing can be filled with a filler material and sealed.

In accordance with one embodiment of the invention, a float switch includes a float housing having an interior cavity and an exterior. A magnetically activated hermetically sealed reed switch is secured within the interior cavity of the float housing in a first orientation, and a permanent magnet is positioned in a second orientation. The permanent magnet is movable between a first activation position and a second non-activation position. The permanent magnet is positioned in and movable within a chamber, the chamber being within the interior cavity of the float housing. The first activation position and the second non-activation position are located within the chamber. To create an electrical circuit, electrical conductors extend from the housing at one end and are electrically coupled to the reed switch.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals.

The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
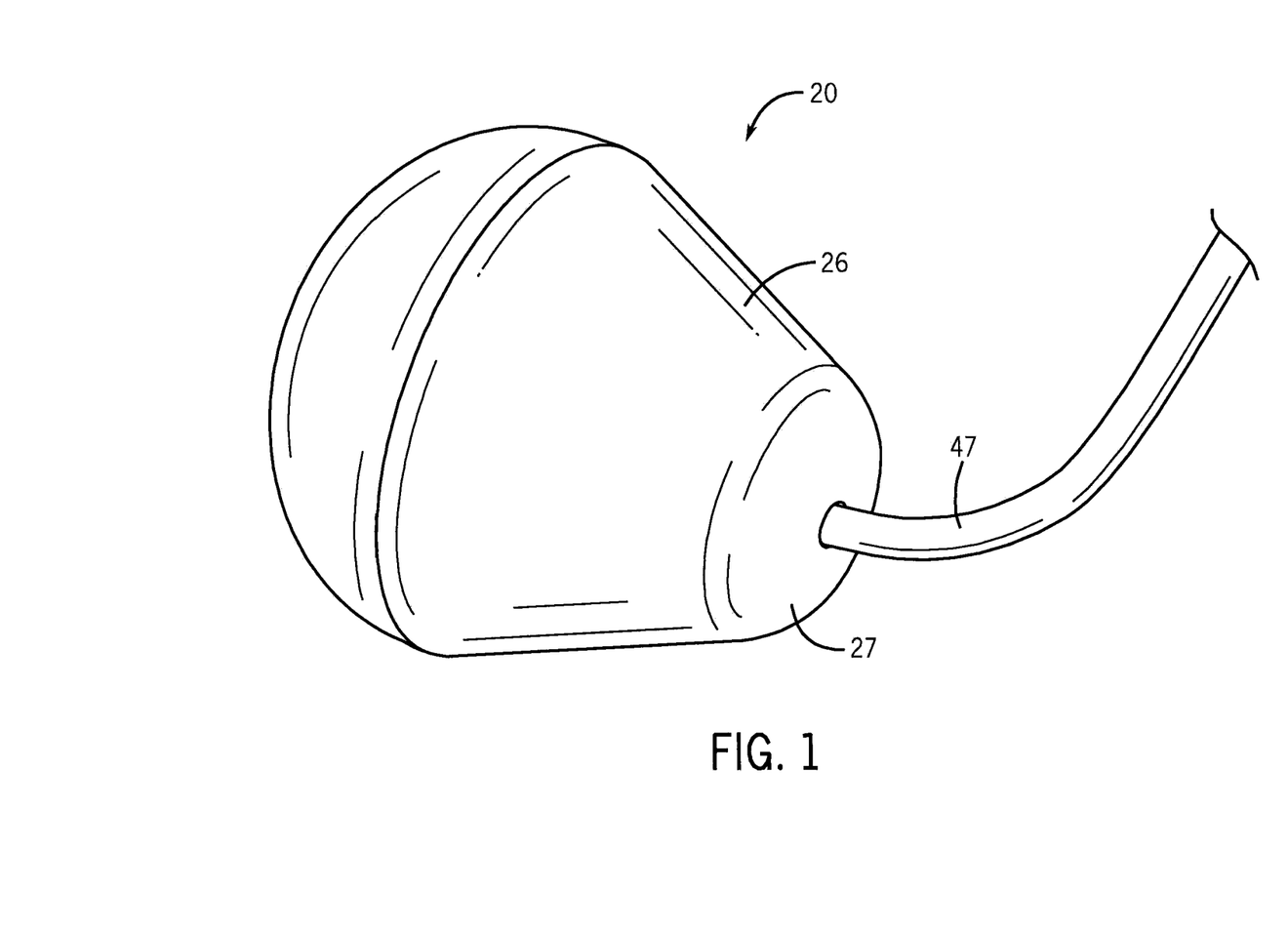
FIG. 1 is a perspective view of a magnetic float switch according to embodiments of the invention.
Figure 2:
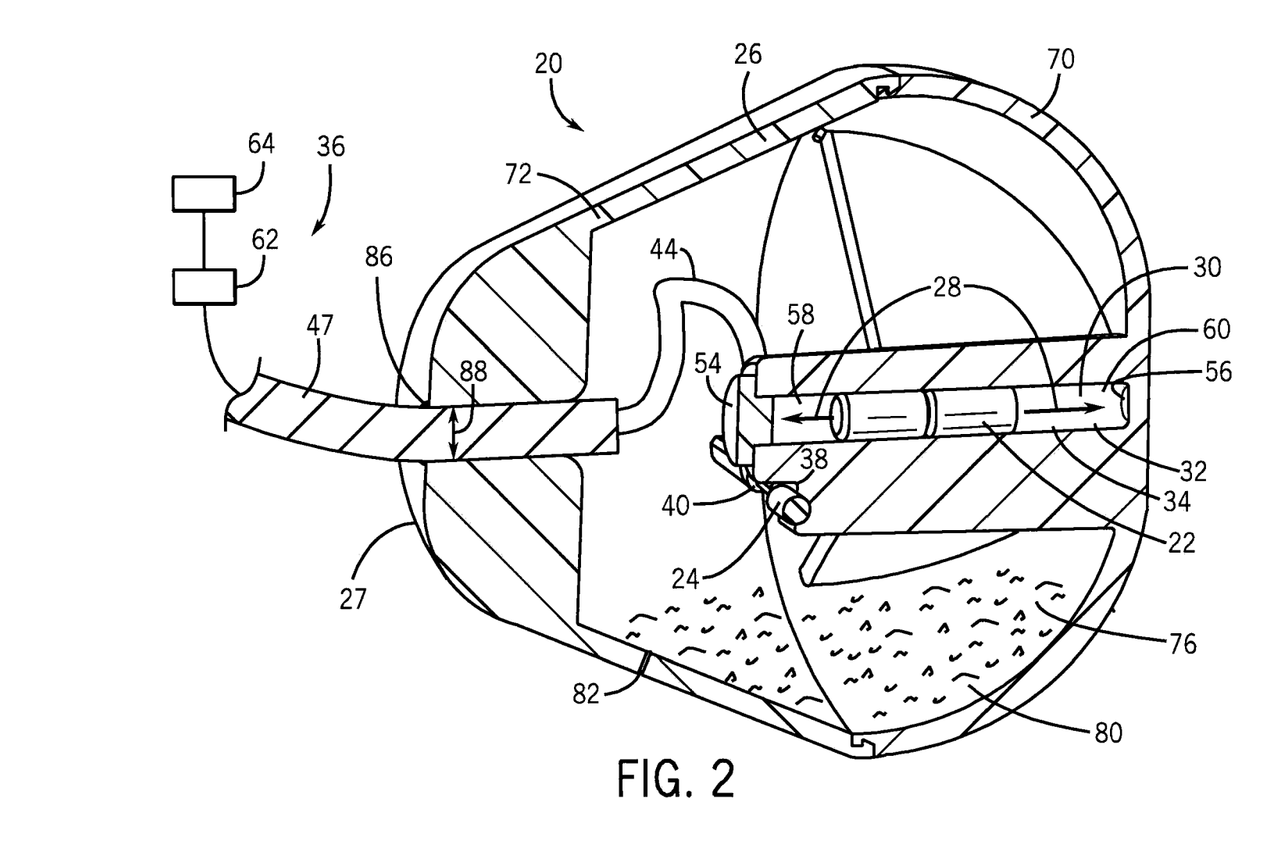
FIG. 2 is a perspective view in partial section of a magnetic float switch, such as that illustrated in FIG. 1.
Figure 3:
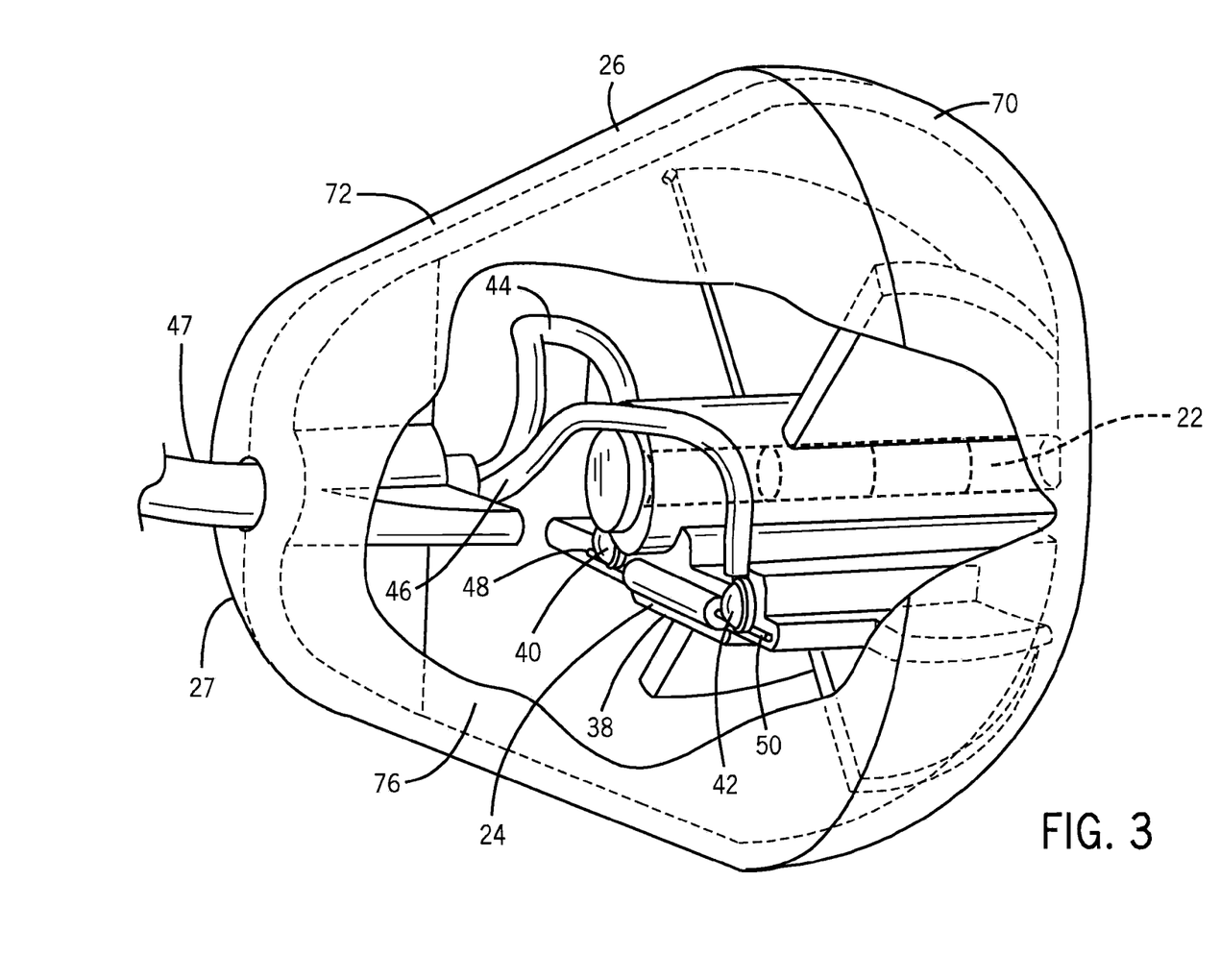
FIG. 3 is a perspective view in partial cutaway of a magnetic float switch, such as that illustrated in FIG. 1.

FIGS. 1-3 illustrate a float switch 20 according to one embodiment of the invention. The float switch 20 includes one or more permanent magnets 22 and one or more hermetically sealed magnetic reed switches 24. In one embodiment, there are only two moving parts within the sealed float housing 26, and the potential for failure or degraded operation is extremely low. By reducing operation of the float switch 20 to only two moving parts, other benefits are achieved, including low cost, high cycle count rating, simple assembly, and durability during shipping, installation, and operation.

The float switch 20 operates by magnetically actuating the magnetic reed switch 24. The magnetic reed switch 24 can be activated by an axially or diametrically magnetized permanent magnet 22 having an appropriate shape (e.g., spherical or cylindrical rod or other appropriate shape) allowing the permanent magnet 22 to slide or roll (as indicated by arrows 28) within a sealed chamber 30 integrated into the interior of the float housing 26. The magnetic reed switch 24 is actuated by the permanent magnet 22 as the permanent magnet 22 approaches the magnetic reed switch 24.

The chamber 30, and the sliding or rolling permanent magnet 22, can be centrally located in the interior of the float housing 26 to allow the float switch 20 to operate in any orientation. The propensity and rate of the permanent magnet 22 to move and the angle of operation can be at least partially controlled or influenced by one or more of the following: a surface finish 32 in the chamber 30, a weight of the permanent magnet 22, a position of the chamber 30 within the float housing 26, and a fluid 34 (e.g., a lubricant or viscous fluid) contained in the chamber 30.

Figure 4A:
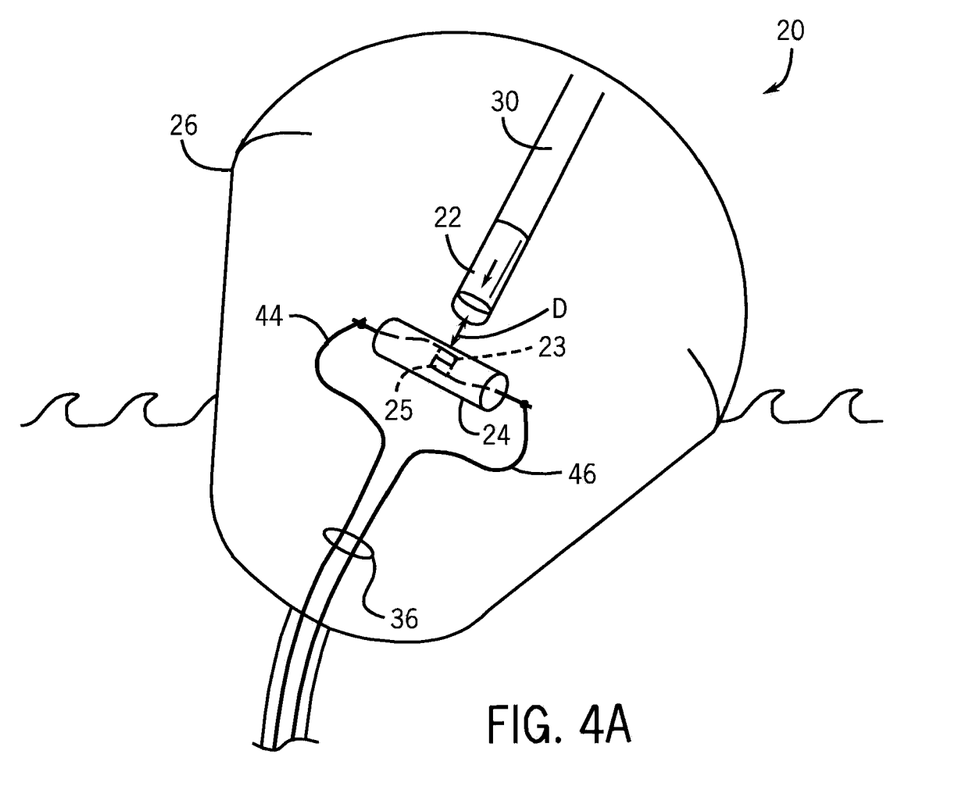
FIG. 4A is a perspective view of a reed switch for use with the magnetic float switch of FIG. 1 in a closed configuration with respect to a permanent magnet within a predefined activation distance.
Figure 4B:
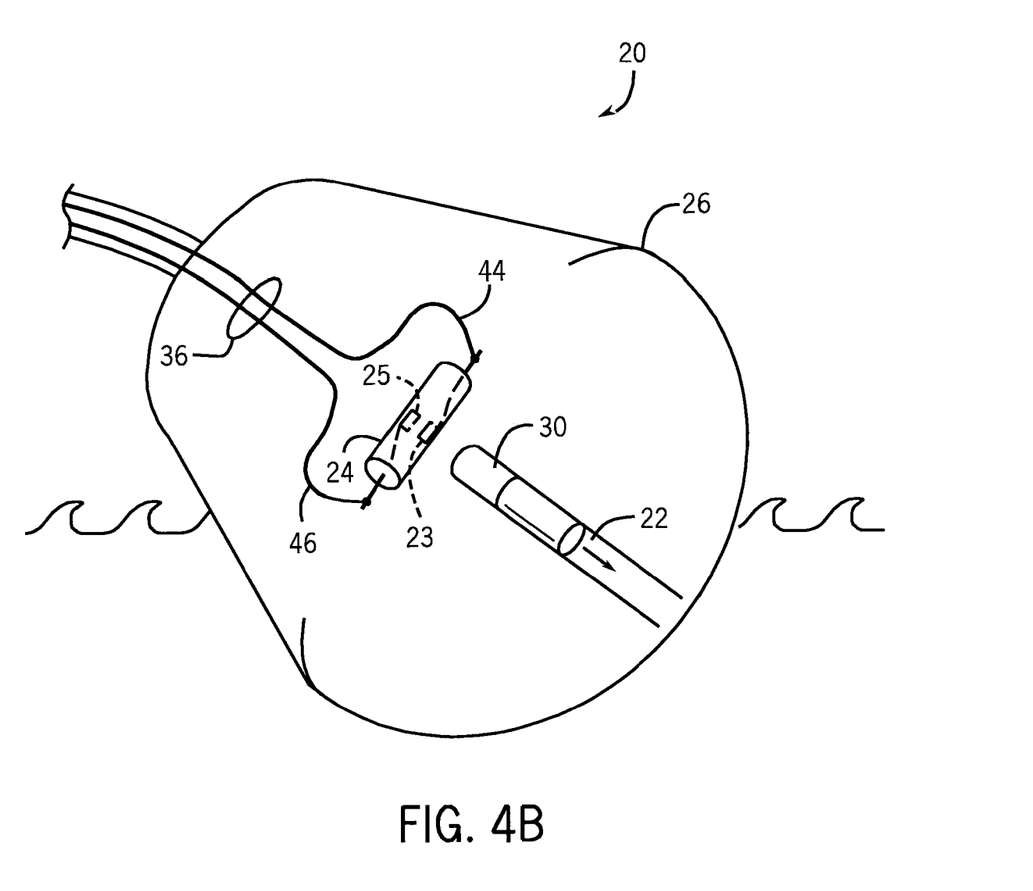
FIG. 4B is a perspective view similar to FIG. 4A, except showing the reed switch in an open configuration with the permanent magnet outside of a predefined activation distance.

As shown in FIGS. 4A and 4B, the permanent magnet 22 slides within the chamber 30 when a change in liquid level affects the attitude of the float housing 26 (i.e., when the float housing moves between certain predetermined angles). As the liquid level rises, the float switch 20 tilts upward, causing the permanent magnet 22 to slide or roll toward the magnetic reed switch 24. In other embodiments, the permanent magnet 22 can activate the magnetic reed switch 24 by moving in any suitable manner either toward or away from the magnetic reed switch 24. Once the permanent magnet 22 is within an activation position, the reed contacts 23, 25 electrically couple and complete the circuit 36 (as shown in FIG. 4A). The activation position can be defined by a predetermined distance D at which point the permanent magnet 22 is capable of magnetically moving at least one of the two reed contacts 23, 25 within the magnetic reed switch 24.

As shown in FIG. 4B, as the liquid level drops, the float switch 20 tilts downward causing the permanent magnet 22 to slide or roll away from the magnetic reed switch 24 to a non-activation position. In the non-activation position, the reed contacts 23, 25 open to re-set the electrical circuit. In other embodiments, the permanent magnet 22 can deactivate the magnetic reed switch 24 by moving in any suitable manner either toward or away from the magnetic reed switch 24. In addition, the placement of the permanent magnet 22 and/or the magnetic reed switch 24 can be adjusted to create different angles of operation and different normally open and normally closed configurations. This adjustability allows the same internal components to be used to satisfy the industry standard for wide and narrow angle, along with normally open and normally closed float switches. In some embodiments, pivot points, cams, and/or levers that can create potential failure points in the system can be eliminated.

As shown in FIGS. 2 and 3, the magnetic reed switch 24 can be coupled to the float housing 26 by screws 40 and 42. In other embodiments, the magnetic reed switch 24 can be molded in place or adhesively bonded to the float housing 26. In still other embodiments, the magnetic reed switch 24 can be snapped or slid into a molded pocket 38, such as with a positive stop, in order to properly locate the magnetic reed switch 24. Other mounting configurations can be used for higher current carrying applications, such as for adding a relay for pump control.

Electrical conductors, such as power and/or control wires 44 and 46, can be encased in a cord 47 and extend in/out of the float housing 26 at one end 27. The wires 44 and 46 are electrically coupled to the magnetic reed switch 24 at the screws 40 and 42, respectively, to complete a circuit 36. In an alternative embodiment, the wires 44 and 46 can be welded (e.g., ultrasonically) to the ends 48 and 50 of the magnetic reed switch 24 to complete the circuit 36.

In some embodiments, the magnetic reed switch 24 can convey its condition (open or closed) using a low level voltage (e.g., 12 VDC) to a control panel 62 which, in turn, can operate a pump or other piece of equipment 64 at a higher voltage level. Alternatively, the magnetic reed switch 24 can convey its condition (open or closed) directly to the pump or other piece of equipment 64 at a higher voltage level (e.g., 120 VAC). In some embodiments, a locking device in the control panel (not shown) keeps the pump 64 operating until another float switch 20 can be actuated by the liquid level, which helps to eliminate switch damage and/or rapid pump or equipment cycling that could result from liquid surface turbulence.

In some embodiments, the cord 47 can include an overmolded plug or block 66 with a receptacle 67 on a side 68 for use as direct pump control, without using the control panel 62. Small horsepower pumps, such as sump pumps, generally do not include a control panel. If the voltage rated contactors are located away from the switch and in-line with the pump power cord, some embodiments of the float switch 20 can be used without modifying the existing small horsepower pump configuration and without modifying the float switch 20 to include voltage rated contacts.

In some embodiments, the float housing 26 can be a thermoplastic shell or another suitable durable material. For example, acrylonitrile butadiene styrene (ABS) can alternatively be used for the float housing 26. As shown in FIGS. 2-3, the float housing 26 can include a cap 70 and a base 72. The cap 70 can be spun, ultrasonically welded, chemically bonded, adhesively bonded, or snapped into place with respect to the base 72, or any combination thereof, to provide a sealed housing. In some embodiments, the float housing 26 can be shaped with a non-directional design to allow the float switch 20 to operate in any orientation (e.g., the float housing 26 functions equally well in all directions or is omnidirectional).

Figure 5A:
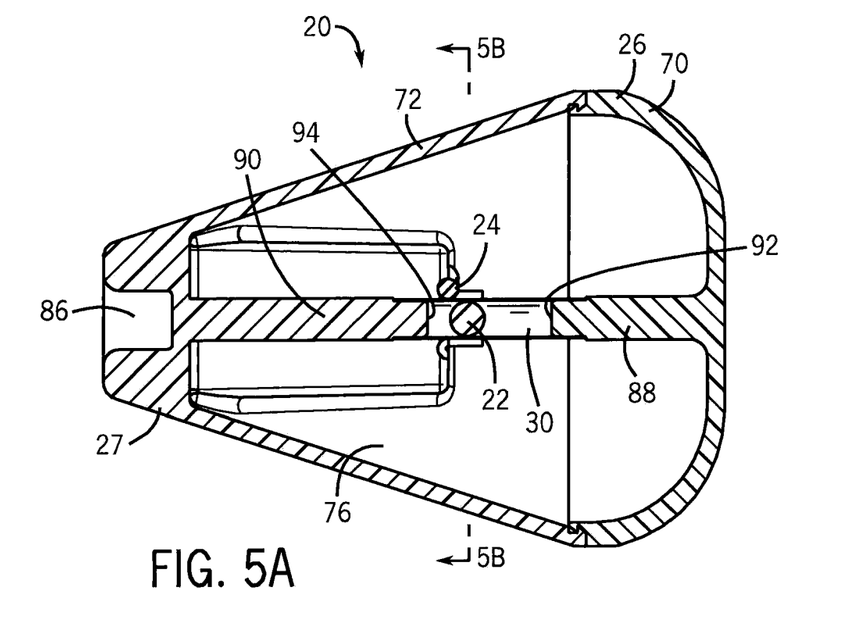
FIGS. 5A and 5B are side and front views in section, respectively, of an alternative embodiment of a magnetic float switch according to embodiments of the invention.
Figure 6A:
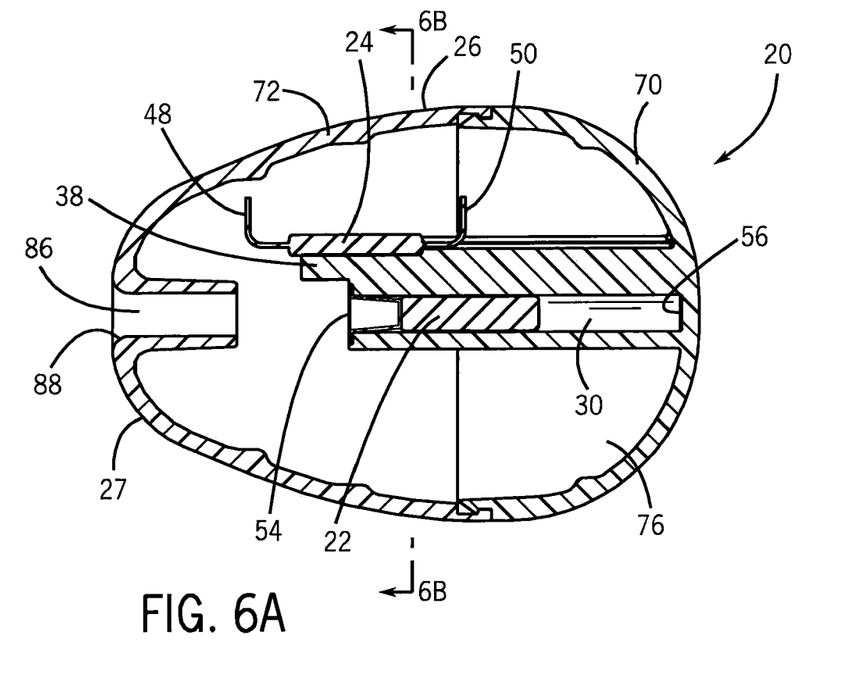
FIGS. 6A and 6B are side and front views in section, respectively, of a magnetic float switch according to another embodiment of the invention.

As shown FIGS. 1, 5A and 6A, one embodiment of a non-directional design can include a generally semicircular cap 70 and a generally cone-shaped base 72 with a rounded end to receive the cord 47.

The chamber 30 can be constructed from the same material as the float housing 26, such as a plastic material, or the chamber 30 can be constructed of a metal tube, or a combination of both materials, for example. As shown in FIG. 2, integral and/or molded positive stops 54 and 56 on each end 58 and 60, respectively, of the chamber 30 can be used to seal the chamber, and/or to constrain the permanent magnet 22 and limit the travel of the permanent magnet 22.

In manufacturing, after coupling the wires 44 and 46 to the magnetic reed switch 24, and inserting the permanent magnet 22 into the chamber 30, some or all of a remaining hollow cavity 76 in the float housing 26 can be filled with a filler material 80, as shown in FIG. 2. The filler material 80 can be an epoxy and/or a foam, to further secure components and protect from physical shock, to maintain buoyancy in case of damage to the float housing 26, and/or to make the float switch 20 water tight. In FIG. 2, the filler material 80 is only partially shown in the cavity 76 for clarity. Use of the filler material 80 to fill the cavity 76 in the float housing 26 also provides the benefit of non-sparking operation for use in hazardous location applications. In some embodiments, the filler material 80 can include a closed cell foam. In other embodiments, the filler material 80 can include a non-water absorbing, dielectric foam. When the filler material 80 is used to fill the cavity 76 during the assembly process, a vent hole 82 (as shown in FIG. 2) in the float housing 26 can be included to allow air and/or excess filler material 80 to escape as the filler material 80 expands in the cavity 76. The vent hole 82 can then be sealed, or the filler material 80 can be allowed to seal the vent hole 82.

As shown in FIG. 2, the float housing 26 can include a cord entry channel 86 that can be sealed with the filler material 80. The cord entry channel 86 can include a predefined radius 88 to help reduce flex strain on the cord 47. The cord entry channel 86 can also extend into the cavity 76 to allow the cord 47 to seal if there is insufficient filler expansion during the assembly process. The filler material 80 can also serve to secure the cord 47 in place to meet industry standard pull strength requirements. In some embodiments, the filler material 80 can eliminate the need for use of a cord grip or other restraining devices, although these devices can also be used in other embodiments.

Figure 5B:
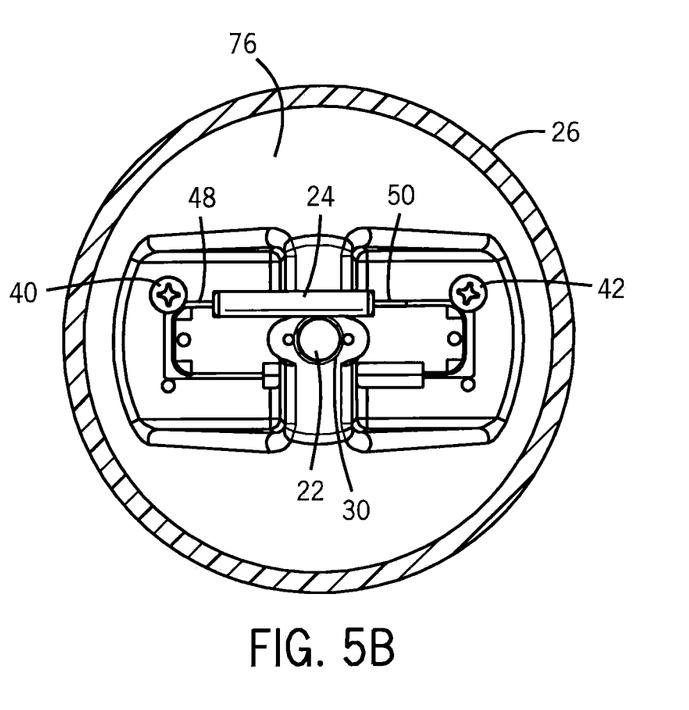

In the embodiment shown in FIGS. 5A and 5B, similar to the embodiment shown in FIGS. 2 and 3, the magnetic reed switch 24 can be oriented perpendicular to the movement of the permanent magnet 22. In this embodiment, the permanent magnet 22 is shown to be spherical. The magnetic reed switch 24 is activated by the permanent magnet 22 that slides or rolls within the chamber 30. The float housing 26 is shown to include integral projections 88, 90 that, when the cap 70 and the base 72 are assembled together, form stops 92, 94 to limit the travel of the spherical permanent magnet 22.

Figure 6B:
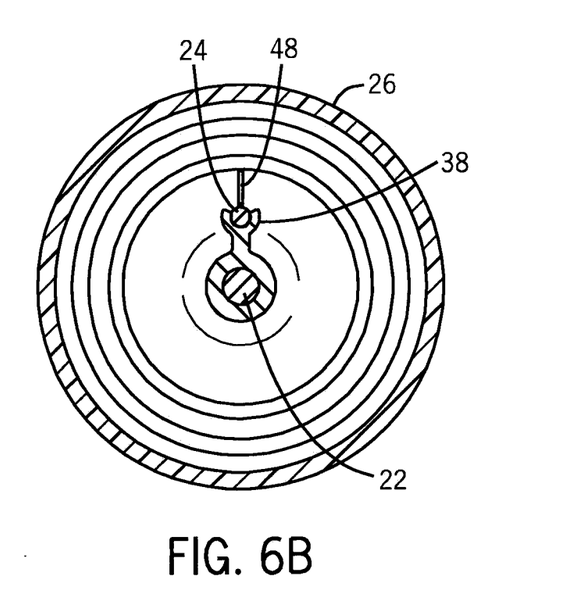

In an alternative embodiment shown in FIGS. 6A and 6B, fasteners have been eliminated and all components are integrated into the float switch 20. In this embodiment, the magnetic reed switch 24 is oriented parallel to the movement of the permanent magnet 22. The magnetic reed switch 24 can be activated by the permanent magnet 22 that slides or rolls within the chamber 30.

Figures 7A, 7B, 7C:
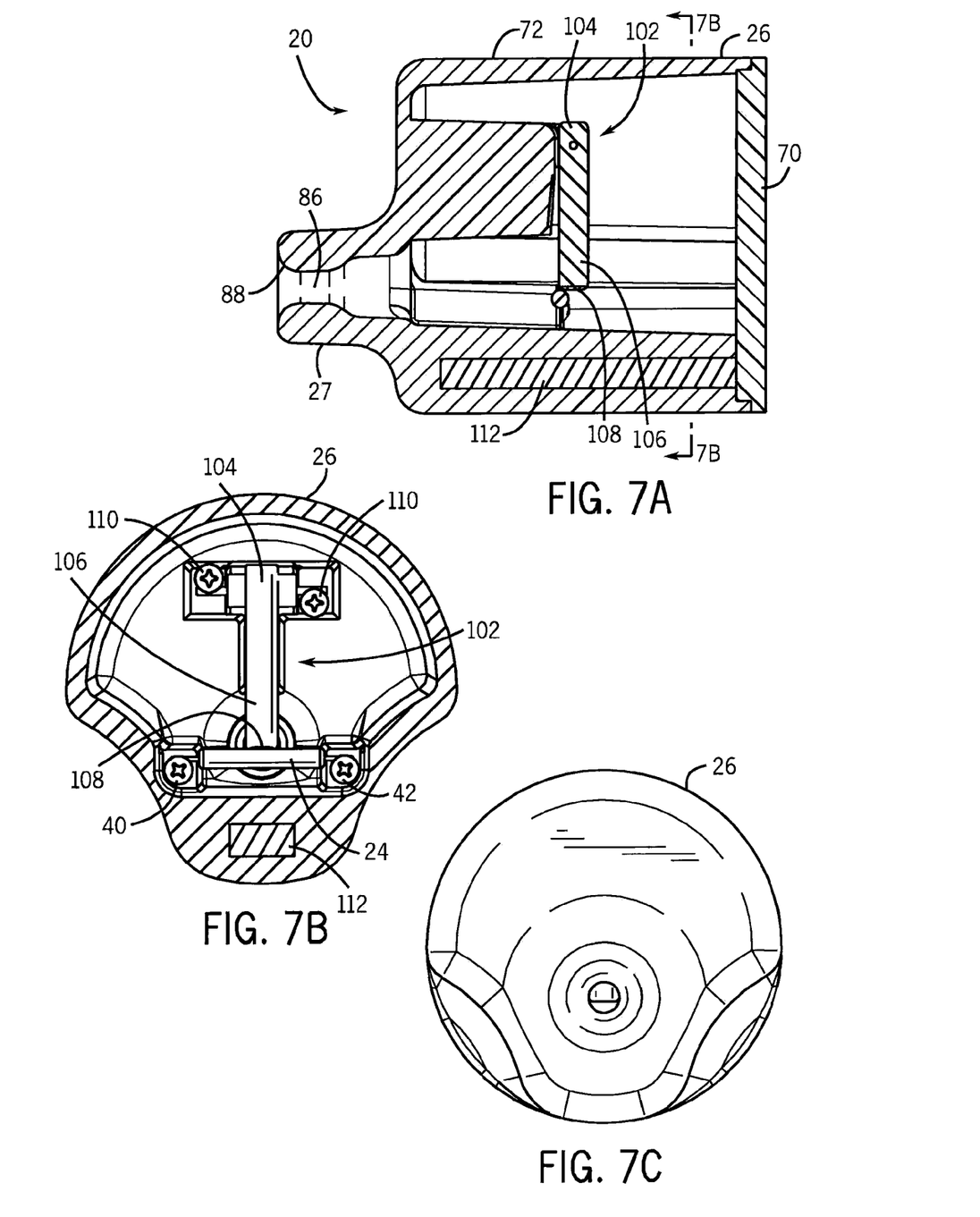
FIGS. 7A and 7B are side and front views in section, respectively, of a magnetic float switch according to another embodiment of the invention.
FIG. 7C is a front view of the magnetic float switch shown in FIGS. 7A and 7B.

In another embodiment shown in FIGS. 7A to 7C, the magnetic reed switch 24 can be activated by a swing arm 102. The swing arm 102 includes a pivot end 104 and a moving end 106, with the moving end 106 including a permanent magnet 108 mounted at or near a distal portion of the moving end 106. The pivot end 104 can be pivotally secured to the float housing 26 using screws 110, or molded fasteners, for example. In operation, as the liquid level rises, the swing arm 102 and the permanent magnet 108 swing toward the magnetic reed switch 24. Once the permanent magnet 108 is near or over the magnetic reed switch 24, the reed contacts electrically couple and complete the circuit. As the liquid level drops, the swing arm 102 and the permanent magnet 108 move away from the magnetic reed switch 24, allowing the reed contacts to open, to reset the electrical circuit.

In one embodiment, as shown in FIGS. 7B and 7C, the float housing 26 can include a boat hull shape to help keep the float switch 20 level in case of turbulence and/or floating debris in the liquid. The boat hull shape also helps to keep the float switch 20 positioned to allow the swing arm 102 to operate properly. In some embodiments, a ballast weight 112 can be used to keep the float switch 20 level while operating. The cord entry channel 86 can also be offset to help stabilize the float switch 20.

Figure 8A:
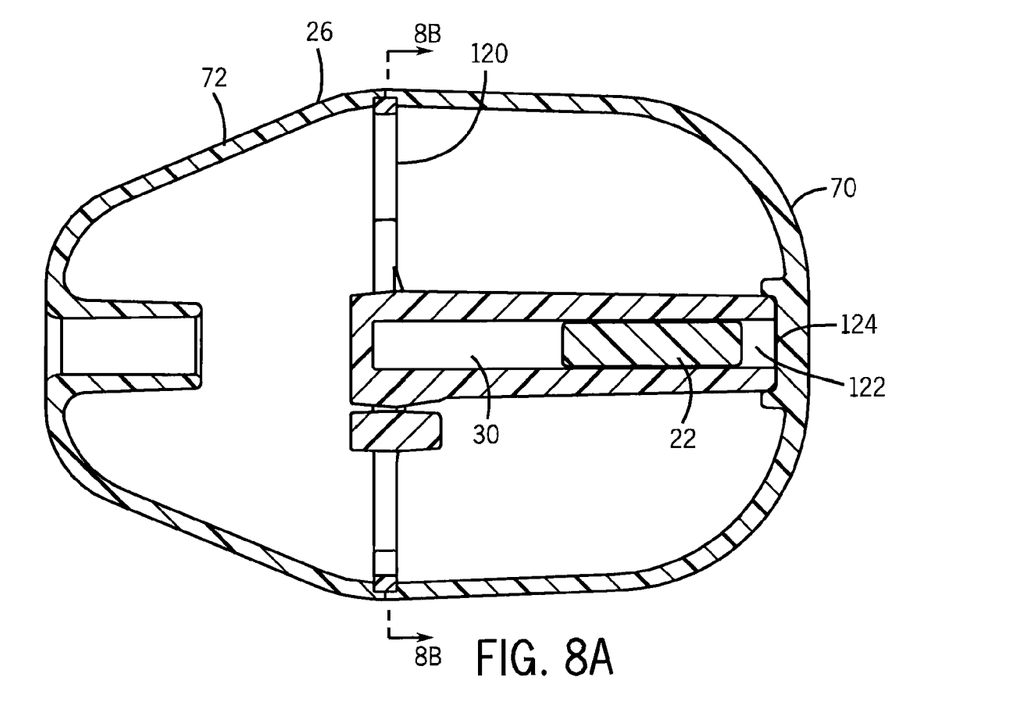
FIGS. 8A and 8B are side and front views in section, respectively, of a magnetic float switch according to another embodiment of the invention.
Figure 8B:
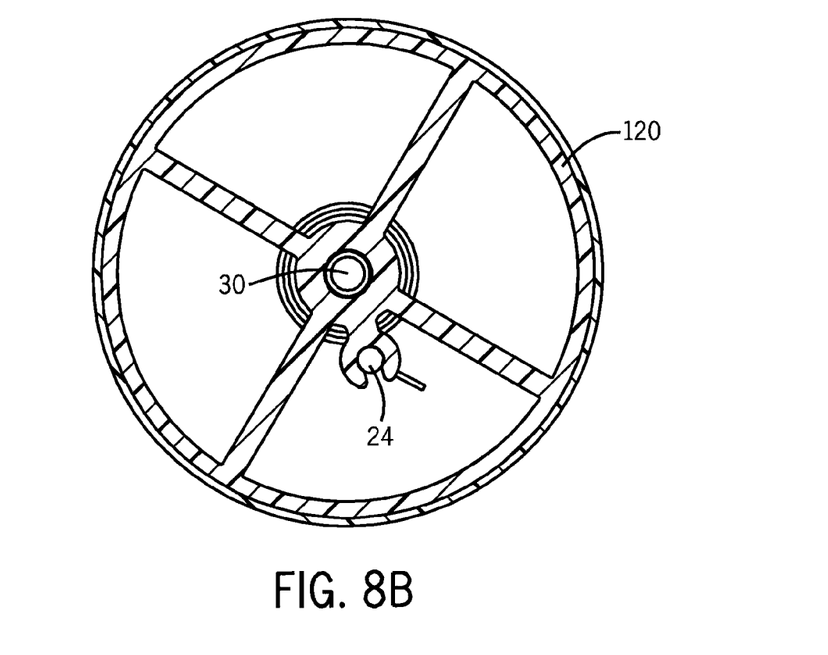

In yet another alternative embodiment shown in FIGS. 8A and 8B, a separately-molded brace 120 can hold the magnetic reed switch 24 and/or the permanent magnet 22. A variety of brace 120 configurations can allow for the accommodation of multiple float applications, such as different current ratings and/or magnet configurations, without the need to modify the outer float housing 26 (e.g., the cap 70 and base 72). In this embodiment, the chamber 30 can include an open end 122 and the cap 70 can include a recess 124 sized to receive the open end 122 of the chamber 30. In this way, the chamber 30 and the permanent magnet 22 are easily aligned with the cap 70, and the permanent magnet 22 can be easily installed during assembly.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A float switch comprising:
a float housing including an interior cavity and an exterior;
a reed switch in a first orientation, the reed switch being magnetically activated and hermetically sealed, the reed switch being secured within the interior cavity;
a permanent magnet in a second orientation, the permanent magnet being movable between a first activation position and a second non-activation position, wherein the second orientation of the permanent magnet is perpendicular to the first orientation of the reed switch;
the permanent magnet being positioned in and movable within a linear chamber, the linear chamber coincident with a central axis of the float housing to allow the float switch to operate in any orientation, the linear chamber being within the interior cavity and having an open end and a closed end, the open end being received by a recess in the float housing, the first activation position and the second non-activation position being within the linear chamber;
the linear chamber having a surface finish, the surface finish at least partially influencing the movement and angle of operation of the permanent magnet; and
electrical conductors extending from the float housing, the electrical conductors electrically coupling to the reed switch to create an electrical circuit.

2. The float switch of claim 1, wherein the first activation position comprises a predetermined distance between the reed switch and the permanent magnet.

3. The float switch of claim 1, wherein the permanent magnet is at least one of axially magnetized and diametrically magnetized.

4. The float switch of claim 1, wherein the permanent magnet is spherical in shape.

5. The float switch of claim 1, wherein the permanent magnet is in the shape of a cylindrical rod.

6. The float switch of claim 1, wherein the movement of the permanent magnet is at least partially influenced by a lubricant in the linear chamber.

7. The float switch of claim 1, wherein the float housing is shaped with a non-directional design to allow the float switch to operate in any orientation.

8. The float switch of claim 1, wherein the linear chamber includes stops on each end to limit movement of the permanent magnet.

9. A float switch comprising:
a float housing including an interior cavity and an exterior, the float housing having a recess within the interior cavity;
a brace within the interior cavity;
a reed switch in a first orientation, the reed switch being magnetically activated and hermetically sealed, the reed switch being secured by the brace within the interior cavity;
a permanent magnet in a second orientation, the permanent magnet being movable between a first activation position and a second non-activation position; and
the permanent magnet being positioned in and movable within a linear chamber, the linear chamber having an open end and a closed end, the open end being received by the recess in the float housing, the linear chamber being secured by the brace and the recess to align the linear chamber within the float housing, the linear chamber coincident with a central axis of the float housing to allow the float switch to operate in any orientation, the permanent magnet being in the linear chamber in both the first activation position and the second non-activation position.

10. The float switch of claim 9, further comprising electrical conductors extending from the housing at one end, the electrical conductors electrically coupling to the reed switch to create an electrical circuit.

11. A method comprising:
placing a magnetically activated hermetically sealed reed switch in a first orientation within an interior cavity of a float housing, the float housing shaped with a non-directional design to allow the reed switch to operate in any orientation;
placing a permanent magnet in a chamber, the chamber being within the interior cavity, the permanent magnet being in a second orientation, the permanent magnet being movable between a first activation position and a second non-activation position;
sealing the chamber by placing a stop on at least a first end of the chamber, receiving a second end of the chamber into a recess in the float housing to align the chamber; and filling the entire interior cavity of the float housing with a filler material.

12. The method of claim 11, and further comprising allowing at least one of air and excess filler material to escape through a vent hole in the float housing.

13. The method of claim 11, further including sealing the float housing.

14. The method of claim 11, further including coupling electrical conductors to the reed switch to create an electrical circuit.

15. The method of claim 11, further including sealing a vent hole in the float housing with the filler material.

16. The method of claim 11, wherein the filler material is at least one of a closed cell foam, a non-water absorbing dielectric foam, and an epoxy.

17. The method of claim 11, further comprising the step of securing electrical conductors with the filler material.

* * * * *